(12) United States Patent
Chiang

(10) Patent No.: US 9,979,693 B2
(45) Date of Patent: May 22, 2018

(54) IP ALLOCATION METHOD FOR USE IN TELECOMMUNICATION NETWORK AUTOMATIC CONSTRUCTION

(71) Applicant: FIBER LOGIC COMMUNICATIONS, INC., Hsinchu (TW)

(72) Inventor: Wen-Der Chiang, Hsinchu (TW)

(73) Assignee: FIBER LOGIC COMMUNICATIONS, INC., Hsinchu (TW)

( * ) Notice: Subject to any disclaimer, the term of this patent is extended or adjusted under 35 U.S.C. 154(b) by 122 days.

(21) Appl. No.: 15/009,165

(22) Filed: Jan. 28, 2016

(65) Prior Publication Data
US 2017/0222969 A1 Aug. 3, 2017

(51) Int. Cl.
*H04L 29/12* (2006.01)
*H04L 12/26* (2006.01)
*H04L 12/18* (2006.01)

(52) U.S. Cl.
CPC .......... *H04L 61/2007* (2013.01); *H04L 12/18* (2013.01); *H04L 12/1886* (2013.01); *H04L 43/106* (2013.01); *Y02D 30/30* (2018.01)

(58) Field of Classification Search
CPC .... H04L 12/18; H04L 43/106; H04L 61/2007
See application file for complete search history.

(56) References Cited

U.S. PATENT DOCUMENTS

| 7,266,632 | B2 * | 9/2007 | Dao | G06F 15/7867 710/100 |
| 7,733,798 | B2 * | 6/2010 | White | H04L 45/02 370/252 |
| 7,756,027 | B1 * | 7/2010 | Reddy | H04L 41/0806 370/230 |
| 7,768,521 | B2 * | 8/2010 | Fuchie | G06T 1/60 345/536 |
| 7,801,840 | B2 * | 9/2010 | Repasi | G06F 21/55 706/52 |
| 7,926,111 | B2 * | 4/2011 | Oliver | G06F 21/552 726/24 |
| 8,036,106 | B1 * | 10/2011 | Hu | H04L 41/0213 370/218 |
| 8,045,195 | B2 * | 10/2011 | Ogashiwa | G06F 21/608 358/1.14 |
| 8,116,336 | B2 * | 2/2012 | Jing | H04L 29/1232 370/312 |

(Continued)

*Primary Examiner* — Eric Nowlin
(74) *Attorney, Agent, or Firm* — WPAT, PC

(57) ABSTRACT

An internet protocol (IP) allocation method involves assigning network domains and IP address domains thereof to network elements (NEs) at the periphery of the domains, connecting the other new NEs in the domains to the (EMS) element management system server (EMS) through random addresses and information carried by Link Layer Discovery Protocol (LLDP) packets, enabling the EMS server to automatically configure, manage, allocate and assign the new NEs so as for the NEs to operate at the IP addresses. If NEs are newly introduced into the telecommunication network, the new NEs can get connected to the EMS server easily and successfully by receiving LLDP packets multicast by the NEs at the periphery of the domains and other NEs which are already connected to the EMS server before.

4 Claims, 4 Drawing Sheets

(56) References Cited

U.S. PATENT DOCUMENTS

| | | | | |
|---|---|---|---|---|
| 8,134,557 B2* | 3/2012 | Fuchie | G06T 15/40 | 345/420 |
| 8,150,370 B2* | 4/2012 | Dempo | H04L 12/4011 | 455/411 |
| 8,205,096 B2* | 6/2012 | Cheng | G06F 21/126 | 713/189 |
| 8,255,497 B2* | 8/2012 | Brant | H04L 29/12216 | 700/179 |
| 8,281,173 B2* | 10/2012 | Diab | H04L 12/12 | 713/323 |
| 8,503,009 B2* | 8/2013 | Suzue | H04N 1/00214 | 358/1.15 |
| 8,700,766 B2* | 4/2014 | Rowe | G06Q 30/0241 | 707/722 |
| 8,700,894 B2* | 4/2014 | Hammell | H04L 63/0464 | 380/277 |
| 8,806,011 B1* | 8/2014 | Graham-Cumming | H04L 63/1458 | 709/225 |
| 8,824,506 B2* | 9/2014 | Shukla | H04L 12/462 | 370/474 |
| 8,885,825 B2* | 11/2014 | Carles | H04L 63/061 | 380/255 |
| 8,893,210 B2* | 11/2014 | Eyer | H04N 21/654 | 725/131 |
| 8,910,280 B2* | 12/2014 | Karasaridis | G06F 21/00 | 709/224 |
| 8,917,594 B2* | 12/2014 | Jain | H04L 47/724 | 370/229 |
| 8,984,635 B1* | 3/2015 | Graham-Cumming | H04L 9/3239 | 726/23 |
| 9,007,909 B2* | 4/2015 | Jain | H04L 47/724 | 370/235 |
| 9,160,565 B2* | 10/2015 | Shukla | H04L 12/462 | |
| 9,197,555 B2* | 11/2015 | Shimonishi | H04L 45/72 | |
| 9,215,146 B2* | 12/2015 | Wakumoto | H04L 41/12 | |
| 9,231,831 B2* | 1/2016 | Chiueh | H04L 41/12 | |
| 9,262,650 B2* | 2/2016 | Nimura | G06F 21/88 | |
| 9,264,313 B1* | 2/2016 | Manuguri | H04L 41/5058 | |
| 9,270,646 B2* | 2/2016 | Shelest | H04L 29/12066 | |
| 9,350,829 B2* | 5/2016 | Graham-Cumming | H04L 63/1458 | |
| 9,369,375 B2* | 6/2016 | Graf | H04L 41/12 | |
| 9,397,895 B2* | 7/2016 | Page | H04L 67/12 | |
| 9,398,470 B2* | 7/2016 | Roeland | H04L 12/14 | |
| 9,401,889 B2* | 7/2016 | Andrews | H04L 61/2015 | |
| 9,442,742 B2* | 9/2016 | Gourlay | G06F 9/4416 | |
| 9,509,742 B2* | 11/2016 | Gordon | H04N 21/23439 | |
| 9,571,286 B2* | 2/2017 | Graham-Cumming | H04L 9/3239 | |
| 9,602,411 B2* | 3/2017 | Lapidous | H04L 61/6009 | |
| 9,626,503 B2* | 4/2017 | Jung | G06F 21/44 | |
| 9,628,976 B2* | 4/2017 | Jeong | H04W 4/24 | |
| 9,661,522 B2* | 5/2017 | Kavunder | H04W 28/0215 | |
| 9,667,568 B2* | 5/2017 | Poggi | H04L 45/66 | |
| 9,832,111 B2* | 11/2017 | Zhou | H04L 12/6418 | |
| 9,838,221 B2* | 12/2017 | Zhang | H04W 24/02 | |
| 2002/0072949 A1* | 6/2002 | Araki | G06Q 10/06 | 705/7.13 |
| 2002/0072950 A1* | 6/2002 | Araki | G06Q 10/06 | 705/7.13 |
| 2006/0200469 A1* | 9/2006 | Chidambaran | G06F 9/5088 | |
| 2006/0236018 A1* | 10/2006 | Dao | G06F 15/7867 | 710/317 |
| 2007/0050231 A1* | 3/2007 | Araki | G06Q 10/06 | 705/7.12 |
| 2007/0216677 A1* | 9/2007 | Fuchie | G06T 15/40 | 345/420 |
| 2007/0216695 A1* | 9/2007 | Fuchie | G06T 1/60 | 345/530 |
| 2007/0220043 A1* | 9/2007 | Oliver | G06F 21/552 | |
| 2008/0027891 A1* | 1/2008 | Repasi | G06F 21/55 | 706/52 |
| 2008/0225324 A1* | 9/2008 | Ogashiwa | H04N 1/44 | 358/1.14 |
| 2008/0225856 A1* | 9/2008 | Kawamura | H04L 12/40 | 370/395.3 |
| 2009/0010434 A1* | 1/2009 | Carles | H04L 63/061 | 380/255 |
| 2009/0059925 A1* | 3/2009 | White | H04L 45/02 | 370/391 |
| 2009/0103734 A1* | 4/2009 | Hammell | H04L 63/0464 | 380/278 |
| 2009/0166414 A1* | 7/2009 | Mori | G06F 1/1632 | 235/383 |
| 2009/0239502 A1* | 9/2009 | Dempo | H04L 12/4011 | 455/411 |
| 2009/0245113 A1* | 10/2009 | Kamiya | H04L 65/80 | 370/238 |
| 2009/0251726 A1* | 10/2009 | Suzue | H04N 1/00214 | 358/1.15 |
| 2010/0024040 A1* | 1/2010 | Nimura | G06F 21/88 | 726/26 |
| 2010/0075751 A1* | 3/2010 | Garvey | G06Q 10/06 | 463/30 |
| 2010/0115067 A1* | 5/2010 | Brant | H04L 29/12216 | 709/221 |
| 2010/0180350 A1* | 7/2010 | Glaubert | G06F 21/85 | 726/34 |
| 2010/0189029 A1* | 7/2010 | Jing | H04L 29/1232 | 370/328 |
| 2010/0235665 A1* | 9/2010 | Diab | H04L 12/12 | 713/323 |
| 2010/0269174 A1* | 10/2010 | Shelest | H04L 29/12066 | 726/22 |
| 2011/0138081 A1* | 6/2011 | Matsuda | H04L 29/1232 | 709/250 |
| 2011/0191593 A1* | 8/2011 | Cheng | G06F 21/126 | 713/189 |
| 2012/0005274 A1* | 1/2012 | Lee | G06F 9/5044 | 709/205 |
| 2012/0047531 A1* | 2/2012 | Eyer | H04N 21/654 | 725/37 |
| 2012/0230192 A1* | 9/2012 | Jain | H04L 47/724 | 370/235 |
| 2012/0230196 A1* | 9/2012 | Jain | H04L 47/724 | 370/235 |
| 2012/0265888 A1* | 10/2012 | Roeland | H04L 12/14 | 709/228 |
| 2013/0003111 A1* | 1/2013 | Mitsubori | H04L 43/0811 | 358/1.15 |
| 2013/0067070 A1* | 3/2013 | Rowe | G06Q 30/0241 | 709/224 |
| 2013/0148547 A1* | 6/2013 | Page | H04L 67/12 | 370/255 |
| 2013/0148666 A1* | 6/2013 | Shimonishi | H04L 45/72 | 370/400 |
| 2013/0176892 A1* | 7/2013 | Shukla | H04L 12/462 | 370/254 |
| 2013/0176900 A1* | 7/2013 | Jogadhenu | H04L 12/2809 | 370/255 |
| 2013/0179549 A1* | 7/2013 | Lin | H04L 61/2092 | 709/221 |
| 2013/0291101 A1* | 10/2013 | Karasaridis | G06F 21/00 | 726/22 |
| 2013/0336165 A1* | 12/2013 | Wakumoto | H04L 41/12 | 370/255 |
| 2014/0123298 A1* | 5/2014 | Jung | G06F 21/44 | 726/26 |
| 2014/0123300 A1* | 5/2014 | Jung | G06F 21/44 | 726/26 |
| 2014/0123305 A1* | 5/2014 | Jung | H04L 41/5054 | 726/27 |
| 2014/0123307 A1* | 5/2014 | Jung | H04L 41/5054 | 726/27 |
| 2014/0133360 A1* | 5/2014 | Chiueh | H04L 41/12 | 370/256 |

(56) References Cited

U.S. PATENT DOCUMENTS

| | | | |
|---|---|---|---|
| 2015/0046942 A1* | 2/2015 | Eyer | H04N 21/654 725/32 |
| 2015/0195382 A1* | 7/2015 | Graham-Cumming | H04L 63/1458 709/232 |
| 2015/0222592 A1* | 8/2015 | Andrews | H04L 61/2015 709/221 |
| 2015/0304247 A1* | 10/2015 | Poggi | H04L 45/66 370/401 |
| 2015/0333912 A1* | 11/2015 | Graham-Cumming | H04L 9/3239 713/168 |
| 2015/0341189 A1* | 11/2015 | Zhang | H04W 24/02 370/338 |
| 2015/0373523 A1* | 12/2015 | Jeong | H04W 4/24 455/406 |
| 2015/0381565 A1* | 12/2015 | Thaler | H04L 61/2046 370/389 |
| 2016/0014142 A1* | 1/2016 | Wang | H04L 12/6418 726/4 |
| 2016/0080254 A1* | 3/2016 | Zhou | H04L 12/6418 370/392 |
| 2016/0085560 A1* | 3/2016 | Gourlay | G06F 9/4416 713/2 |
| 2016/0088578 A1* | 3/2016 | Das | H04W 56/001 370/350 |
| 2016/0091913 A1* | 3/2016 | Pani | G05F 1/66 700/291 |
| 2016/0112481 A1* | 4/2016 | Pani | H04L 12/4633 370/390 |
| 2016/0127440 A1* | 5/2016 | Gordon | H04N 21/23439 709/219 |
| 2016/0132689 A1* | 5/2016 | Nimura | G06F 21/88 726/1 |
| 2016/0142218 A1* | 5/2016 | Kim | H04M 15/8083 370/259 |
| 2016/0218977 A1* | 7/2016 | Lapidous | H04L 61/1511 |
| 2016/0218978 A1* | 7/2016 | Lapidous | H04L 61/6009 |
| 2016/0219013 A1* | 7/2016 | Lapidous | H04L 61/1511 |
| 2016/0269252 A1* | 9/2016 | Manuguri | H04L 41/12 |
| 2017/0078350 A1* | 3/2017 | Gordon | H04N 21/23439 |
| 2017/0149731 A1* | 5/2017 | Lapidous | H04L 61/1511 |
| 2017/0222969 A1* | 8/2017 | Chiang | H04L 12/1886 |

* cited by examiner

IP ALLOCATION METHOD FOR USE IN TELECOMMUNICATION NETWORK AUTOMATIC CONSTRUCTION

FIELD OF THE INVENTION

The present invention relates to an IP allocation method for use in telecommunication network automatic construction to suit an in-band/out-of-band network management architecture and allocate IP addresses to network elements without any DHCP server.

BACKGROUND OF THE INVENTION

According to the prior art, telecommunication network construction entails configuring every new network element so that all the network elements can be controlled and managed at a central master end, such as an element management system.

However, configuring a large number of network elements requires much manpower and takes much time; hence, the costs incurred in the manpower and time thus spent increase with the quantity of the network elements installed. In addition, the owner has to pay for the training of the staff engaged in constructing the network elements.

According to the prior art, an increase in the demand for the network elements is accompanied by increased staffing and lengthy construction. However, in the long run, the huge demand for manpower is transient, while lengthy construction turns away prospective users and slows down the growth of telecommunication networks. Hence, the aforesaid techniques are pricey and inefficient.

Although the aforesaid drawbacks of the prior art can be overcome as soon as automatic configuration is carried out with software after the network elements have undergone physical wiring construction. But before the automatic configuration process, a network element must to gain the IP address information of the element management system server and an IP address available for the network element. As a result, the aforesaid construction processes are pricey and inefficient when carried out in a conventional way.

To overcome the aforesaid drawbacks of the prior art, the present invention provides an IP address allocation method which suits Link Layer Discovery Protocol (LLDP) multicast packets such that automatic telecommunication network construction can be carried out without any DHCP server but in a way which covers different IP address domains.

SUMMARY OF THE INVENTION

It is an objective of the present invention to provide an IP allocation method for use in telecommunication network automatic construction, such that network elements newly introduced into a telecommunication network get connected to an element management system server (EMS server) easily, thereby constructing the telecommunication network quickly and automatically.

Another objective of the present invention is to apply the aforesaid method whereby network elements newly introduced into a telecommunication network get connected to the element management system server easily and successfully when guided by the other network elements already successfully connected to the element management system server.

Yet another objective of the present invention is to apply the aforesaid method whereby IP addresses are allocated to network elements newly introduced and ready to be connected to the element management system server without any DHCP server but in a way which can cover different IP address domains.

A further objective of the present invention is to apply the aforesaid method whereby, before constructing a network which will be full and complete, it is feasible to plan the IP address domain information for use in every network domain and allow peripheral network elements (which are usually apparatuses located at the borders of a LAN or VLAN) of the domains to gain access to the IP address domain information and any information required for connection to a management server.

A further objective of the present invention is to apply the aforesaid method whereby, to carry out multicast with Link Layer Discovery Protocol (LLDP) packets, the LLDP packets not only carry IP address domain information of current network domain, and the IP address information pertaining to connection to a management server, but also carry the latest timestamp connected to the management server to thereby allow the information to function as the basis of the updating of the other NEs upon receipt of the LLDP packets, confirm whether the information in the NE's possession is real-time or not before multicast begins, and allow the LLDP packets to carry the information and thus the multicast to begin only when the information in the NE's possession is real-time.

In order to achieve the above and other objectives, the present invention provides an IP allocation method for use in telecommunication network automatic construction, adapted to configure a plurality of network elements and an element management system (EMS) server in an in-band/out-of-band network management architecture, the method comprising: a pre-allocating step for allocating a plurality of network domains, assigning IP address domains to the network domains, dividing the IP address domains into a random partition and a assigned partition, storing these setting in a database in the EMS server respectively, and putting IP-related data of the domains and the IP address of the EMS server in packets of Link Layer Discovery Protocol (LLDP) of the pre-allocated NEs, so as to be multicast together with timestamp information of the LLDP packets; an EMS server connection step for enabling a network element to connect to the EMS server through receipt of the LLDP packets, wherein the LLDP packets comprises a random partition of the IP address domain of current network domains such that the network element gets an IP address in a random partition of the IP address domain and connected to the EMS server through IP address of the EMS server; and an EMS server registration step for enabling the network element to access information of an assigned IP address within the assigned partition of the IP address domain allocated by the EMS server upon receipt of packets whose registration is confirmed by the EMS server and update the IP address of the network element to the assigned IP address to thereby rebuild a network connection route between the network element and the EMS server, wherein, after getting connected to the EMS server through the assigned IP address, the network element updates LLDP packet multicast status of the network element to an active status to thereby multicast LLDP packets associated with the network element, wherein the LLDP packets associated with the network element comprises IP address of the EMS server, a random partition of the IP address domain information of the current network domain, and timestamp of updating the network element.

Compared with the prior art, the present invention provides a telecommunication network automatic construction IP allocation method whereby a NE gets connected to a EMS server automatically and gets configured by the EMS server such that a connection route is built between the NE and the EMS server.

After the NE has successfully got connected to the EMS server, it is feasible for the NE to send a message about the successful connection to the other NEs through LLDP packets to enable the other NEs to get connected to the EMS server by analyzing the random partition of the IP Address domain and the IP address of the EMS server, which is carried by the packets.

BRIEF DESCRIPTION OF THE DRAWINGS

Objectives, features, and advantages of the present invention are hereunder illustrated with specific embodiments in conjunction with the accompanying drawings, in which.

DETAILED DESCRIPTION OF THE PREFERRED EMBODIMENTS

The present invention involves performing a pre-allocating step in a network environment to thereby plan the related configuration of a network in advance, such that network elements (hereinafter referred to as NE) and peripheral network elements (also known as trail termination points) of network domains can get connected to an element management system server (EMS server) quickly and successfully.

Figure 1:
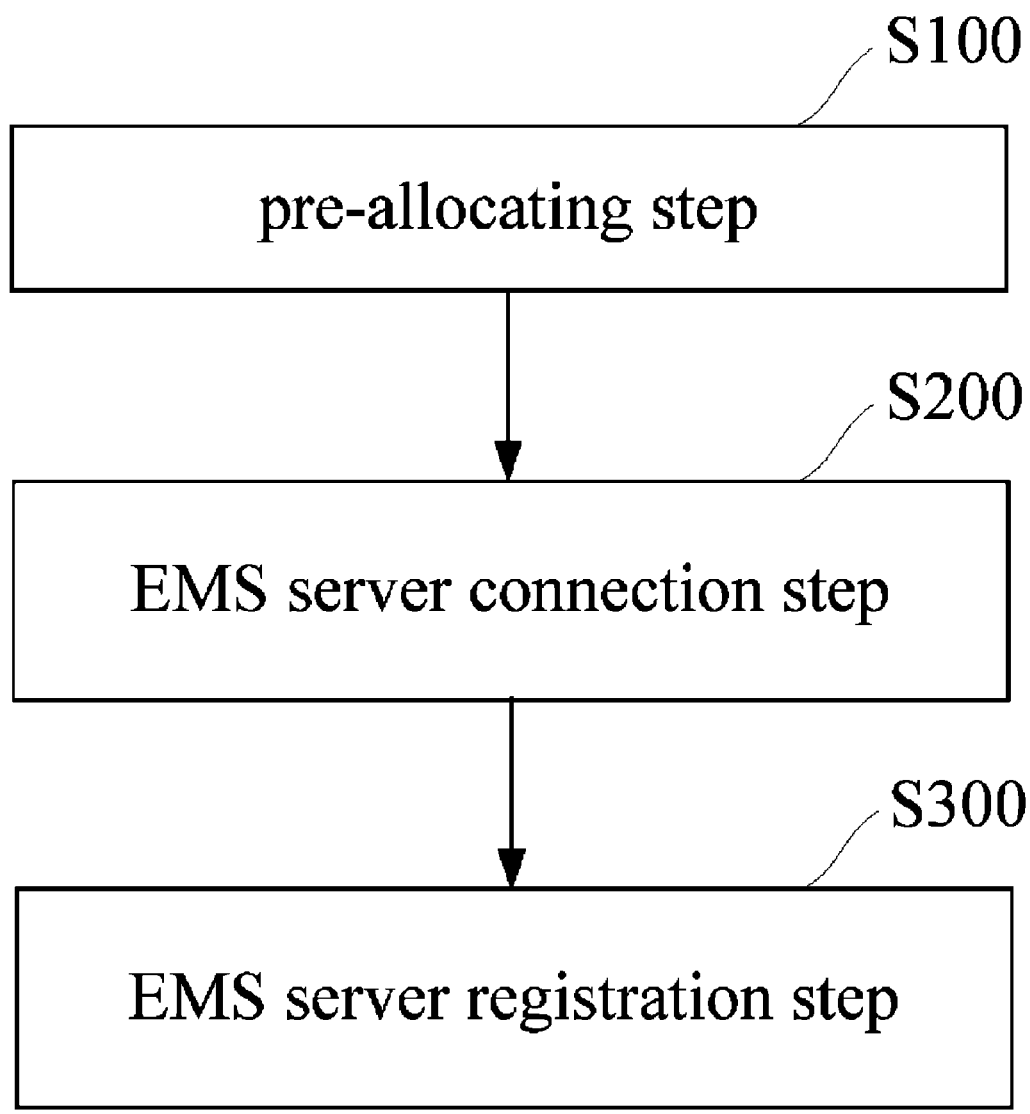
FIG. 1 is a flowchart of an IP allocation method for use in telecommunication network automatic construction according to an embodiment of the present invention.

Referring to FIG. 1, there is shown a flowchart of an IP allocation method for use in telecommunication network automatic construction according to an embodiment of the present invention. A telecommunication network construction method of the present invention comprises a pre-allocating step S100, an EMS server connection step S200, and an EMS server registration step S300.

The pre-allocating step S100 involves allocating a plurality of network domains, assigning IP address domains to the network domains, respectively, and putting IP-related data of the domains and the IP address of the EMS server in packets of Link Layer Discovery Protocol (LLDP), so as to be multicast together with timestamp information of the LLDP packets.

In the EMS server connection step S200, the NE access a random partition of the IP address domain of the network domain and the IP address of the EMS server through the LLDP packets, and the NE choose an IP address its own from the random partition of the IP address domain to get connected to the EMS server.

In the EMS server registration step S300, after receiving packets whose registration is confirmed by the EMS server, the NE would get an IP address in an assigned IP address partition assigned by the EMS server for building a connection between the NE and the EMS server. And then rebuilding a network connection route between the NE and the EMS server, wherein the NE updates and sets the multicast status of LLDP packets of the NE to be active in order to carry out the multicast of the LLDP packets attributed to the NE after the NE have got connected to the EMS server through the assigned IP address, wherein the LLDP packets attributed to the NE contain IP address of the EMS server, the random partition of the IP address domain information of the current network domain, and a timestamp of the updating of the NE.

Figure 2:
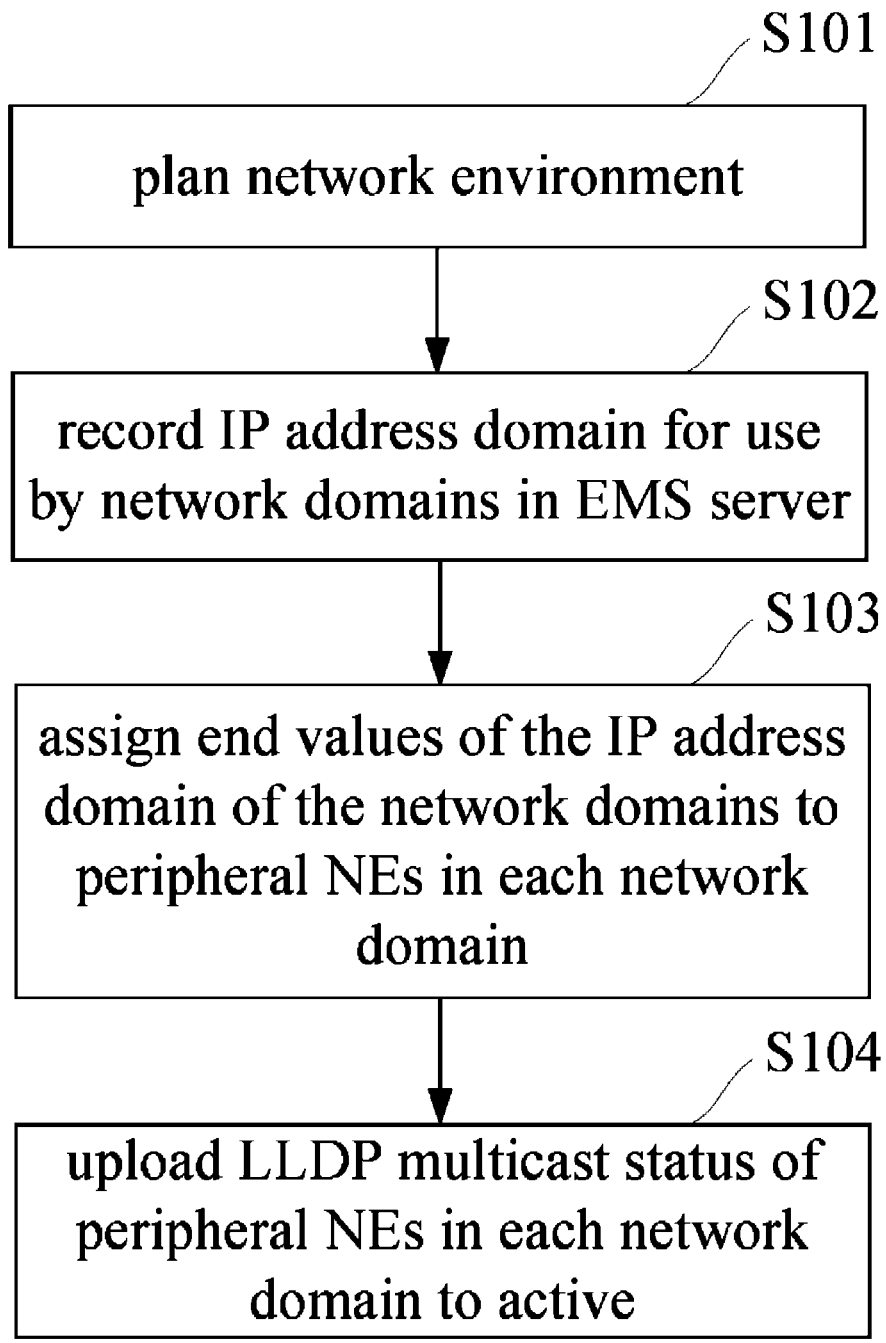
FIG. 2 is a schematic view of a pre-allocating step of the IP allocation method for use in telecommunication network automatic construction according to an embodiment of the present invention.
Figures 3, 4:
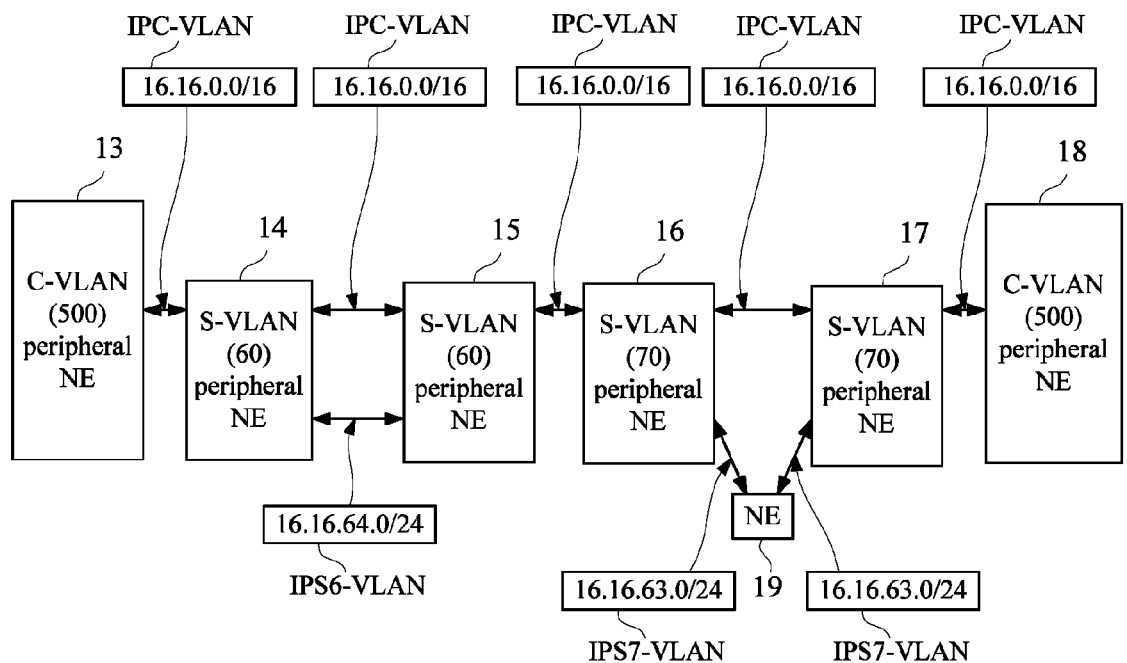
FIG. 3 is a schematic view of the scope of multicast on a VLAN network and LLDP packets on the network according to an embodiment of the present invention.
FIG. 4 is a schematic view of configuration of access to a database in an EMS server according to an embodiment of the present invention.

Referring to FIG. 2, there is shown a schematic view of a pre-allocating step of the IP allocation method for use in telecommunication network automatic construction according to an embodiment of the present invention. As shown in FIG. 2, before a telecommunication network is built in its entirety, step S101 involves planning the network environment and planning the IP address domain required for each network domain. After the planning process of step S101 is done, step S102 involves recording and storing the configuration information of the IP address domain of each network domain in a database of the EMS server. Referring to FIGS. 3, 4, FIG. 3 depicts the stored contents, and FIG. 4 shows that a table 20 of the contents, fields 21 which contain the names of the network domains, and fields 22 which contain the IP address domains of the network domains. Take table 20 as an example, it shows that one C-VLAN (500) and two S-VLAN (60, 70) are operating under the protocol of LLDP, and the network domains at different levels use different multicast addresses. Data kept in the database tells the levels of the network domains. For example, C-VLAN (500) has an IP address domain of 16.16.x.0/16, whereas the two S-VLAN (60, 70) have an IP address domain of 16.16.x.0/24.

In step S103, the IP address of the IP domains to network elements in each said network domain is assigned to NEs at the periphery of the network domains, such that the end values of the IP of the IP domains to network elements are assigned to corresponding NEs in each network domain and thus allow the corresponding NEs to function as peripheral NEs located within the network domains and adapted to define the network domains, respectively. Take the network of FIG. 4 as an example, the network comprises one C-VLAN (500) and two S-VLAN (60, 70) located within the C-VLAN (500). In the aforesaid network architecture, the peripheral NEs of the network domains of C-VLAN (500) are peripheral NE13 and peripheral NE18, respectively, whereas the peripheral NEs of the network domains of S-VLAN (60) are peripheral NE14 and peripheral NE15, respectively, wherein the peripheral NEs of the network domains of S-VLAN (70) are peripheral NE16 and peripheral NE17, respectively.

The configuration of peripheral NEs is done at the end of step S103. In step S104, the configured peripheral NEs begin to operate on the network, and the multicast status of LLDP packets in the peripheral NEs is changed from the default inactive status to the active status. Then, the active peripheral NEs begin to send LLDP packets, while the packets contain the following information: (1) the random partition of the IP address domain for use in network domains; (2) information pertaining to connection to an EMS server, that is, the IP address of the EMS server; and (3) a timestamp of sending the LLDP packets. The pre-allocating step ends as soon as the sending of the LLDP packets begins.

FIG. 4 shows the contents of LLDP packets sent from the domains. For instance, the multicast address for use in sending the peripheral NE13 of C-VLAN (500) domains to the LLDP packets of peripheral NE18 is "01-80-C2-00-00-03" attributed to the "nearest non-TPMR bridge" level defined by LLDP. The LLDP with a level defined in "the nearest non-TRMR bridge" is transferred by using the multicast mac address "01-80-C2-00-00-03". By definition of LLDP, this multicast address at the aforesaid level can be transferred by penetrating the C-VLAN. According to the present invention, the packets of multicast LLDP carry the information of the IP address domain for use by the C-VLAN, such as 16.16.0.0/16 as indicated by address information IPC-VLAN, such that each NE within the C-VLAN network domains is informed of the IP address domain information through multicast of peripheral NE (14~17) of C-VLAN and S-VLAN network domains. The peripheral NEs are also known as peripheral switchers.

Figure 5:
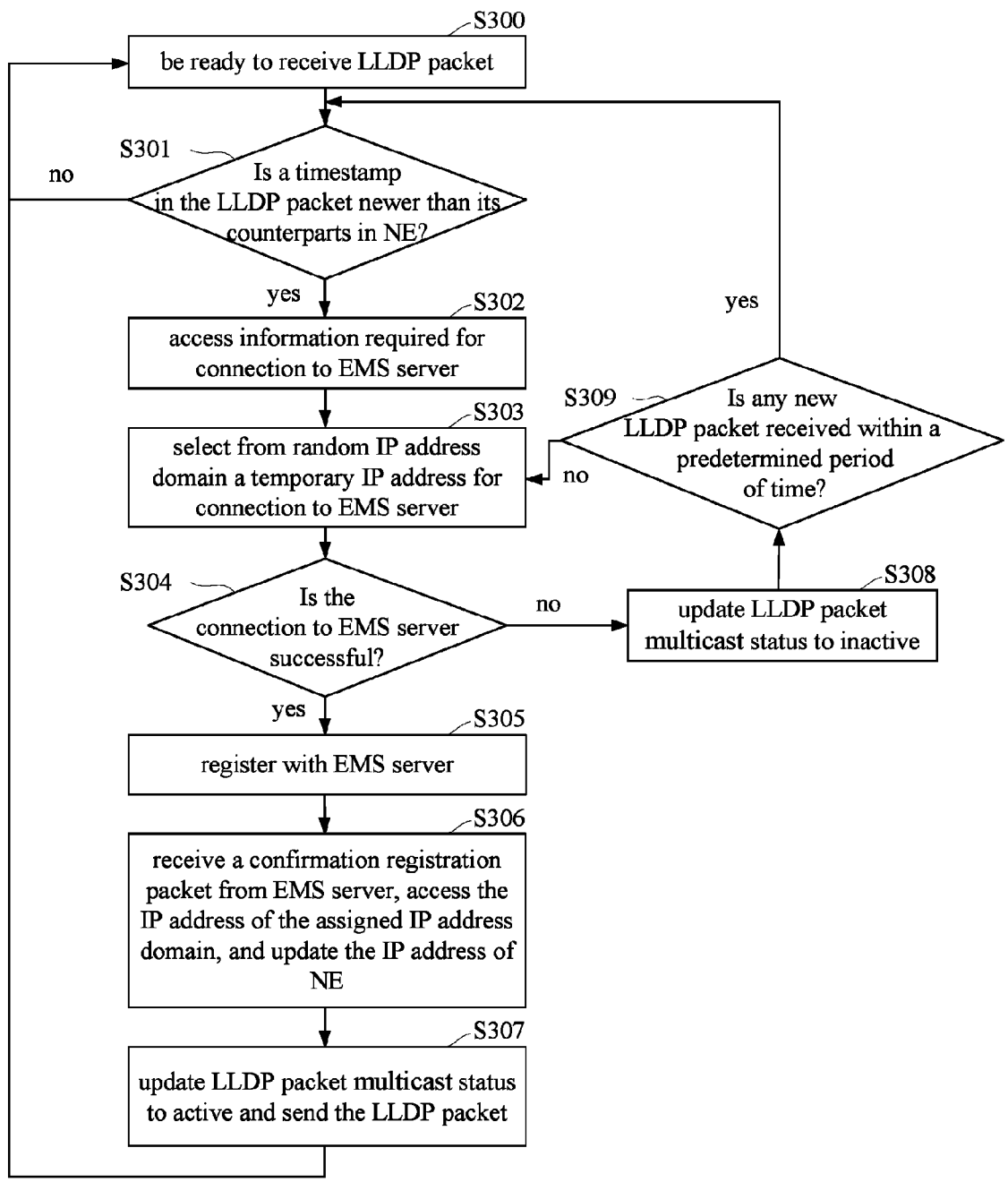
FIG. 5 is a flowchart of a method of connecting and registering EMS servers according to an embodiment of the present invention.

Referring to FIG. 4, IPS6-VLAN has the IP address domain information of 16.16.64.0/24 sent in S-VLAN (60) network domains, whereas IPS7-VLAN has the IP address domain information of 16.16.63.0/24 sent in S-VLAN (70) network domains. At the end of the pre-allocating step, the aforesaid information is sent from peripheral elements (NE) of S-VLAN network domains, using a multicast address of "01-80-C2-00-00-0E" of the "nearest bridge" level defined by LLDP, and the aforesaid information is carried by LLDP multicast packets, and thus each NE, such as NE19, within the S-VLAN network domains is informed of the IP address domain information through multicast. Referring to FIG. 5, there is shown a flowchart of a method of connecting and registering EMS servers according to an embodiment of the present invention. In step S300, a NE newly introduced into a network gets ready to receive the LLDP packets in order to access any network-related information carried by the packets. Since LLDP packets are "layer-2" packets, it is unnecessary to configure the IP address of the newly introduced NE in advance.

In step S301, after the NE receives a multicast LLDP packet, it compares the timestamp of LLDP packet with the timestamps kept by the NE to determine whether the timestamp of the received LLDP packet is new. It is only when a LLDP packet received has a new timestamp that the network information carried by the packet substitutes for existing setting within the NE (that is, going to step S302). If the timestamp of the received LLDP packet is old, the process flow of the method goes to step S300 to receive the next LLDP packet.

In step S302, network information carried by LLDP packets and accessed by the NE includes the information pertaining to connection of the EMS server and the random partition of the IP address domain for use by the current network domains indicated by the LLDP packets, wherein the information is saved to a record kept by the NE, and the timestamp of the record is updated and changed to the timestamp carried by the LLDP packets multicast at a later moment. Hence, in this step, the NE accesses the random partition of the IP address domain of the current network domain in the LLDP packets. Referring to FIG. 4, the IP addresses of the network domains of S-VLAN (70) are 16.16.63.0 through 16.16.63.255, for example. In step S302, the random partition of the IP address domain is set to 16.16.63.0 through 16.16.63.20, whereas the assigned partition of the IP address domain is set to 16.16.63.21 through 16.16.63.255.

In step S303, the IP address of the NE is set. The NE selects a random IP address for temporarily functioning as the local IP address of the NE, such that the NE can be connected to the EMS server in the telecommunication network through the selected network IP address.

In step S304, the NE with the local IP address registers the connection information with the EMS server to thereby build a network connection route between the NE and the EMS server.

In step S305, after getting connected to the EMS server successfully, the NE sends a registration message to the EMS server to let the EMS server know that the NE is ready for being placed under the control of the server. After receiving the registration message, the EMS server selects an unused IP address from the assigned partition of the IP address domain of the network domains, such that the selected unused IP address functions as the IP address for use by the NE, and a message is sent to the NE to inform the NE of the selected unused IP address.

In step S306, after the EMS server sends an update packet through the network connection route, the NE reconfigure the IP address of the NE according to the update packet. For instance, in the preceding example, an IP address is selected from the assigned IP address domain (16.16.63.21 through 16.16.63.255) by the EMS server.

In step S307, after the NE has registered with the EMS server, the LLDP packet multicast status of the network elements is updated and set to active in order to carry out the multicast of LLDP packets associated with the network elements, wherein the LLDP packets associated with the network elements carry the IP address of the EMS server, the random partition of the IP domain information of the network domain, and the timestamp of updating the network elements. Step S307 is followed by step S300.

If the NE is not successfully registered with the EMS server, the process flow of the method of the present invention will go to step S308. In the step S308, the network elements (NE) cannot register with the EMS server, and the LLDP packet multicast status of the NE is updated and changed to inactive to thereby stop sending the LLDP packets.

In step S309, after waiting for a predetermined period of time, the NE determines whether it receives any LLDP packets from the other NEs during the predetermined period of time. If the determination of step S309 is affirmative, step S309 will be followed by step S301 to compare the timestamps in the packets. If the determination of step S309 is negative, step S309 will be followed by step S303 to select from the random partition of the IP address domain another IP address for connecting with the EMS server.

According to the present invention, a telecommunication network construction method is characterized in that: a plurality of network domains and IP address domains of the network domains are configured in advance; the configurations are set to the peripheral NEs of the network domains, respectively; after being configured, the NEs are distributed on the telecommunication network; The telecommunication network construction method of the present invention enables the coming NEs to independently get connected to the EMS server through the receipt and analysis of LLDP packets and configures the assigned IP addresses of the network elements through the EMS server to thereby build a connection route there between. The telecommunication network is constructed without any DHCP server and without the conventional one-by-one approach.

If the NE get connected to the EMS server successfully, the random partition of the IP address domain for use by the network elements (NE), information pertaining to connection of the EMS server, and timestamps of updating information can be multicast to the other network elements (NEs)

through LLDP frames, such that the other network elements gain access to the information by analyzing the LLDP frames and thus get connected to the EMS server successfully.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. An internet protocol (IP) allocation method for use in telecommunication network automatic construction, adapted to configure a plurality of network elements and an element management system (EMS) server in an in-band/out-of-band network management architecture, the IP allocation method comprising:
   a pre-allocating step of:
      allocating a plurality of network domains, assigning IP address domains to the plurality of the network domains, respectively, and
      putting IP-related data of the plurality of the network domains and an EMS server IP address in Link Layer Discovery Protocol (LLDP) packets, so as to be multicast together with timestamp information of the LLDP packets;
   an EMS server connection step of:
      enabling a network element to connect the EMS server through receipt of the LLDP packets, wherein the LLDP packets comprises a random partition of an IP address domain of current network domains such that the network element gets a network element IP address in the random partition of the IP address domain and connected to the EMS server through the EMS server IP address; and
   an EMS server registration step of:
      enabling the network element to access information of an assigned IP address within an assigned partition of the IP address domain allocated by the EMS server upon receipt of the LLDP packets whose registration is confirmed by the EMS server and update the network element IP address to the assigned IP address to thereby rebuild a network connection route between the network element and the EMS server, wherein, after getting connected to the EMS server through the assigned IP address, the network element updates LLDP packet multicast status of the network element to an active status to thereby multicast LLDP packets associated with the network element, wherein the LLDP packets associated with the network element comprises the EMS server IP address, the random partition of the IP address domain of the plurality of the network domains, and a timestamp of updating the network element.

2. The IP allocation method of claim 1, wherein the pre-allocating step comprises:
   (a1) planning network environment to thereby assign IP address domains for use by the plurality of network domains and the network domains in the network environment;
   (a2) recording the IP address domains for use by the network domains in the EMS server;
   (a3) assigning end values of the IP address of the IP domains to network elements in each said network domain to thereby allow the network elements to function as peripheral network elements located within the network domains and adapted to define the network domains, respectively; and
   (a4) updating LLDP packets multicast status of peripheral network elements in each said network domain to active, such that the peripheral network elements multicast the LLDP packets, wherein the LLDP packets of the peripheral network elements comprise IP address information of the EMS server, a random partition of the IP address domain of the network domain, and timestamps of updating the peripheral network elements.

3. The IP allocation method of claim 1, wherein the EMS server connection step comprises:
   (b1) getting the network elements ready to receive an LLDP packet;
   (b2) determining, by the network elements upon receipt of the LLDP packet, whether the timestamp in the LLDP packet is newer than their counterparts in the network elements, wherein the network elements keep waiting for the next LLDP packet when the determination is negative, and the method goes to the next step when the determination is affirmative;
   (b3) accessing IP address information of the EMS server and IP-related data, wherein the random partition of the IP address domain of the current network domain in the LLDP packets; and
   (b4) connecting the network elements to the EMS server by allowing the network elements to use an IP address in the random partition of the IP address domain.

4. The IP allocation method of claim 3, wherein, upon a failure of registering the EMS server by the network elements, a LLDP packets multicast status of the network elements is updated to inactive such that the method goes to step (b2) when another LLDP packet is received within a predetermined period of time and to step (b4) when not, allowing the network elements to get connected to the EMS server through another IP address in the random partition of the IP address domain, wherein the LLDP packets carry timestamp-related information.

* * * * *